US008307001B2

(12) United States Patent  
Ager et al.

(10) Patent No.: US 8,307,001 B2  
(45) Date of Patent: Nov. 6, 2012

(54) AUDITING OF CURATION INFORMATION

(75) Inventors: Tryg A. Ager, Palo Alto, CA (US); Christopher M. Johnson, Oakland, CA (US); Gerald G. Kiernan, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 730 days.

(21) Appl. No.: 11/843,961

(22) Filed: Aug. 23, 2007

(65) Prior Publication Data

US 2009/0055365 A1 Feb. 26, 2009

(51) Int. Cl.
G06F 17/30 (2006.01)
(52) U.S. Cl. ........................................................ 707/783
(58) Field of Classification Search .................. 707/783, 707/999.009
See application file for complete search history.

(56) References Cited

U.S. PATENT DOCUMENTS

| | | | |
|---|---|---|---|
| 5,317,729 A | | 5/1994 | Mukherjee et al. |
| 5,557,742 A * | | 9/1996 | Smaha et al. .................. 726/22 |
| 5,905,984 A | | 5/1999 | Thorsen |
| 6,134,664 A * | | 10/2000 | Walker ............................ 726/22 |
| 6,725,240 B1 * | | 4/2004 | Asad et al. ........................... 1/1 |
| 7,051,052 B1 * | | 5/2006 | Shapiro et al. ................ 707/610 |
| 7,409,398 B1 * | | 8/2008 | Flam et al. ..................... 707/100 |
| 2003/0028495 A1 | | 2/2003 | Pallante |
| 2006/0041555 A1 | | 2/2006 | Blessin et al. |
| 2006/0080316 A1 | | 4/2006 | Gilmore et al. |
| 2006/0212491 A1 | | 9/2006 | Agrawal et al. |
| 2006/0248592 A1 | | 11/2006 | Agrawal et al. |
| 2007/0192478 A1 * | | 8/2007 | Louie et al. .................... 709/224 |

OTHER PUBLICATIONS

Rakesh Agrawal, Roberto Bayardo, Christos Faloutsos, Jerry Kiernan, Ralf Rantzau, Ramakrishnan Srikant, "Auditing Compliance with a Hippocratic Database", Proceeding of the 30th VLDB Conference, Toronto, Canada, 2004.*

* cited by examiner

Primary Examiner — Kimberly Wilson  
Assistant Examiner — Mohammed R Uddin  
(74) Attorney, Agent, or Firm — Brian Lambert; Hoffman Warnick LLC

(57) ABSTRACT

An approach that tracks curation history of sensitive information is described. In one embodiment, there is a database that contains a plurality of sensitive information. The database comprises a plurality of base tables and backlog tables for each of the base tables. A curation audit query generator is configured to receive a curation audit expression that specifies sensitive information to be audited and generates a curation audit query from the curation audit expression to run against the database. The curation audit expression contains syntax clauses that specify a time period for the audit, stipulate a specific base table in the database as source of the audit and examine whom is responsible for making changes to the specified sensitive information.

6 Claims, 4 Drawing Sheets

FIG. 2A

| ID | Operative | Location | Source |
|---|---|---|---|
| 1 | X | Jakarta | Informant A |
| 2 | Y | Oslo | Informant C |

FIG. 2B

| ID | Operative | Location | Source |
|---|---|---|---|
| 1 | secret | top secret | top secret |
| 2 | secret | secret | top secret |

FIG. 2C

Sightings-curation-backlog

| id | Operative | Location | Source | User | Op | Ts |
|---|---|---|---|---|---|---|
| 1 | secret | secret | top secret | Alex | I | 1 |
| 2 | secret | secret | top secret | Alex | I | 2 |
| 1 | secret | top secret | top secret | Gayle | U | 3 |
| 2 | unclass. | unclass. | secret | David | U | 4 |

FIG. 2D

SQL-Commands

| c-id | user | ts-beg | ts-end | ... | command-string |
|---|---|---|---|---|---|
| ... | | | | | |
| #7 | UserA | T1 | T1.7 | | insert into sightings values ... |
| #8 | UserB | T2 | T2.5 | | insert into sightings values ... |
| #9 | UserB | T3 | T3.6 | | insert into sightings values ... |
| #10 | UserA | T4 | T4.5 | | insert into sightings values ... |
| #11 | UserX | T5 | T5.4 | | insert into suspects select ... |
| #12 | UserY | T6 | T6.2 | | update suspects set location ... |
| ... | | | | | |

| | |
|---|---|
| During | current date − 1 year to current date |
| Audit-curation | Sightings-curation s |
| Where | s.id = 2 and |
| | before s.source > after.source | curation
audit
query
generation

| | |
|---|---|
| select | f('Sightings-curation-backlog', s2.ts) |
| from | Sightings-curation-backlog s1, |
| | Sightings-curation-backlog s2 |
| where | s1.id = 2 and |
| | s2.id = 2 and |
| | s1.ts between current date − 1 year to current date and |
| | s2.ts between current date − 1 year to current date and |
| | s1.ts < s2.ts and |
| | not exists (select 1 from Sightings-curation-backlog s3 where s3.ts between s1.ts and s2.ts) and |
| | s1.source > s2.source |

FIG. 3

AUDITING OF CURATION INFORMATION

BACKGROUND

This disclosure relates generally to managing sensitive information, and more specifically to information curation and auditing of privacy sensitive information.

Information curation is the process of applying and modifying disclosure policies to individual information items. National security information is one example of sensitive information that is subject to information curation. For example, upon the intake of national security information, an authorized government official sets a classification level for the information. Typically, the classification level can include a top secret classification, a secret classification, a confidential classification, or an unclassified classification.

In addition to setting a classification level for the sensitive information, the government official may also attach a policy that establishes the purposes for which the sensitive information may be used and recipients to whom the information may be disclosed. Over time, the government official or other authorized officials may modify the classification and disclosure policy. For example, a government agency may lower the classification level or prepare a less sensitive version of the information for release to another agency, tactical operation, or an unclassified domain. Additionally, the government agency may reclassify the information if it has been released or possibly raise the classification level if the information is part of multiple items of information that could be aggregated to reveal information at a higher classification level. Government information systems must therefore enable authorized officials to curate items of information by modifying applicable disclosure policies.

SUMMARY

In one embodiment, there is a method for tracking curation history of sensitive information. In this embodiment, the method comprises: receiving a curation audit expression that specifies sensitive information to be audited, wherein the curation audit expression contains syntax clauses that specify a time period for the audit, stipulate a specific base table in a database containing sensitive information to audit and examine whom is responsible for making changes to the specified sensitive information; formulating a curation audit query from the curation audit expression; and running the curation audit query against the database to ascertain the curation history of the specified sensitive information.

In a second embodiment, there is a curation auditing system that tracks curation history of sensitive information. In this embodiment, the curation auditing system comprises a database containing a plurality of sensitive information. The database comprises a plurality of base tables and backlog tables for each of the base tables. A curation audit query generator is configured to receive a curation audit expression that specifies sensitive information to be audited and generates a curation audit query from the curation audit expression to run against the database. The curation audit expression contains syntax clauses that specify a time period for the audit, stipulate a specific base table as a source of the audit and examine whom is responsible for making changes to the specified sensitive information.

In a third embodiment, there is a computer-readable medium storing computer instructions, which when executed, enables a computer system to perform a method of conducting a curation audit of sensitive information. In this embodiment, the method comprises accepting a curation audit expression that specifies sensitive information to be audited, wherein the curation audit expression contains syntax clauses that specify a time period for the audit, stipulate a specific base table in a database containing sensitive information that is a source of the audit and examine whom is responsible for making changes to the specified sensitive information; formulating a curation audit query from the curation audit expression; and running the curation audit query against the database to ascertain curation history of the specified sensitive information.

BRIEF DESCRIPTION OF THE DRAWINGS

FIGS. 2A-2D show the type of infrastructure of tables that enable the curation auditing system of FIG. 1 to conduct an audit;

FIG. 3 shows an example of generating a curation audit query from a curation audit expression using the system shown in FIG. 1.

DETAILED DESCRIPTION

Embodiments of this disclosure include a curation auditing technique that tracks curation histories over sensitive information using logs of database updates. In particular, all updates made to database tables are stored in backlog tables; each backlog table recording all updates to a source table. In addition, a statement log records all queries submitted to the database along with annotations such as users submitting the queries and the time that the queries were submitted. A curation audit expression language is used to declaratively specify the curation information to be audited. The curation audit expression language uses syntax and semantics that specify a time period for the audit, a specific table in a database as the source of the audit and examine whom is responsible for making changes to the audited information. This technique reveals users that made modifications to sensitive information that qualify the audit expression and times in which these changes were made. Those skilled in the art will recognize that the command log is not necessary to perform the curation auditing. However, it can be used to complement the audit by revealing suspicious logged statements that exhibit patterns of potential misuse.

Figure 1:
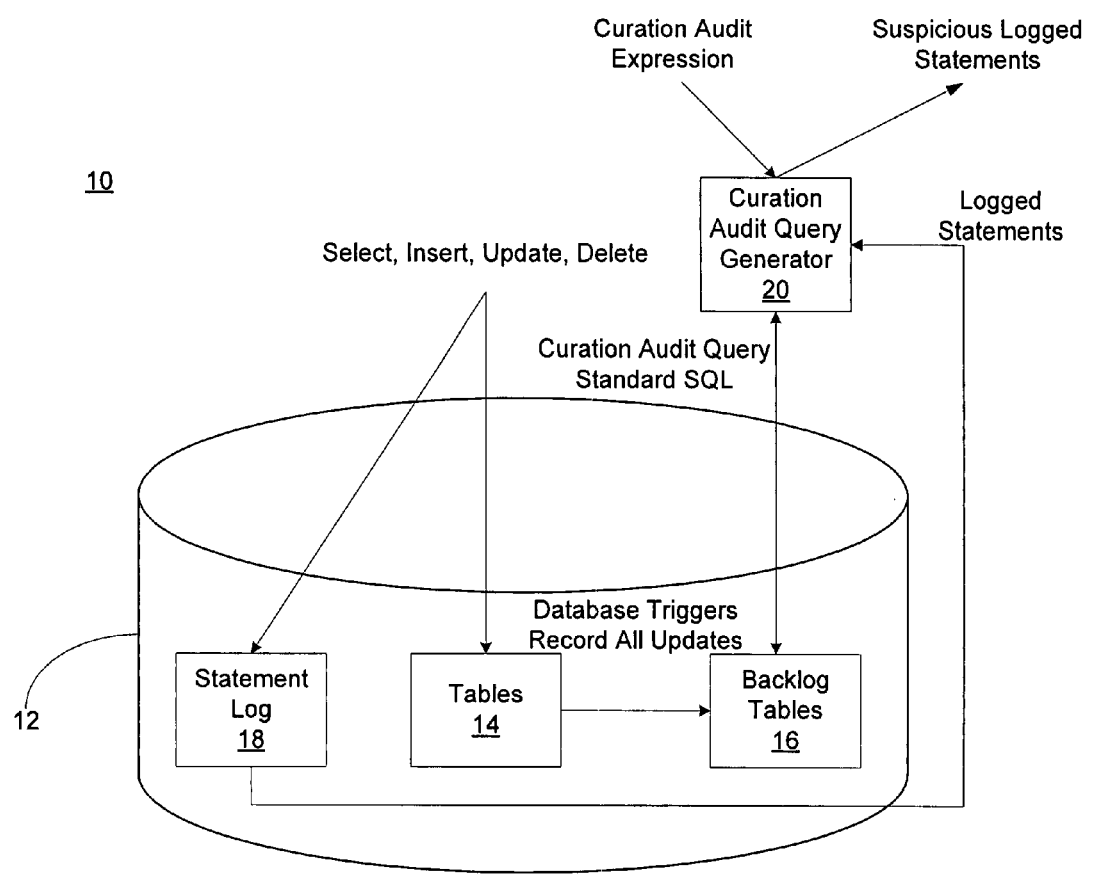
FIG. 1 shows a curation auditing system that enables tracking of curation histories of sensitive information according to an embodiment of this disclosure.

FIG. 1 shows a curation auditing system 10 that enables tracking of curation histories of sensitive information within a database management system. In FIG. 1, a database 12 stores a plurality of sensitive information. In the description that follows, the curation auditing system 10 is described with reference to government information such as national security information that is categorized into various classification levels that each accord different levels of protection based on the expected damage that the information might cause if in the wrong hands. Examples of classification levels for government information may include top secret, secret, confidential and unclassified. Although the description is directed at government information such as national security information, the curation auditing system 10 is suitable for use with any type of sensitive information or knowledge that might result in loss of an advantage or level of security if revealed.

Referring back to FIG. 1, the database 12 comprises a plurality of base tables 14 and backlog tables 16 that correspond to each of the base tables. Each base table 14 contains sensitive information, queries (e.g., Select) and updates that modify disclosure policies of the sensitive information (e.g., Insert, Update and Delete). Database triggers are used to capture and record all updates made to base tables 14 into backlog tables 16 for recovering the state of the database 12 at any past point in time. A statement log 18 logs the text of every query processed by the database system along with annotations such as the time when the query was executed, the user submitting the query, and the query's purpose.

To perform a curation audit, an auditor formulates curation audit expressions that declaratively specify sensitive information to be audited. The curation audit expressions contain syntax that specifies a time period for the audit, stipulates a specific base table in the database to audit and examines whom is responsible for making changes to the specified sensitive information.

Because curation auditing targets general updates, the before and after values of update operations are features of the audit expression language. In one embodiment, the following syntax and semantics are used as the audit expression language to declaratively specify the curation information to be audited:

During Current Date;
Audit-Curation; and
Where

The During clause of the audit expression specifies a time period for the audit, the Audit-Curation clause stipulates a specific curation table to be audited and the Where clause examines who has updated the policy.

A curation audit query generator 20 is configured to receive a curation audit expression from the auditor and process the expression into a SQL query to run against the database 10. In particular, the audit expression over a source table is translated into an SQL query over backlog tables (hereafter referred to as the curation audit query). The before and after images of a source tuple in the audit expression are isolated in the curation audit query with a join over the backlog table selecting pairs of tuples representing alternative but continguous versions of the source tuple.

The curation audit returns identifications of parties responsible for making policy changes to the specified sensitive information along with times that any policy change were made. In addition, the audit returns logged statements of a suspicious nature that are associated with any policy changes made for the specified sensitive information.

Disclosure policies can be updated to raise or lower classification levels for an item of information without modifying the actual cell containing the information. FIGS. 2A-2D show the type of infrastructure of tables according to one embodiment that are used to enable the curation auditing system 10 to conduct an audit of government information curation that relates to national security information. In particular, FIG. 2A shows an example of a sightings table that is suitable for use in the system 10 shown in FIG. 1. In this example, the sightings table contains classified identities of enemy operatives, their reported locations, and the source of each sighting. The first column of the table identifies the primary key (ID) that applies to each row, the second column identifies a particular enemy operative, the third column identifies the location of the enemy operative and the fourth column identifies the source of the information pertaining to the enemy operative.

Authorized government officials can change the policies applicable to an information item by modifying annotations to a curation table. FIG. 2B shows an example of a sightings-curation table that is suitable for use with the sightings table shown in FIG. 2A. In particular, FIG. 2B shows how a government official named Gayle can raise the classification for the "Jakarta" cell in the sightings table of FIG. 2A from "secret" to "top secret" by changing the annotation of the Location column in the sightings-curation table of FIG. 2B.

When a user submits a query to the government agency's database system, the query is rewritten to comply with applicable disclosure policies. In this example, the disclosure policy for the sightings table of FIG. 2A references the sightings-curation table of FIG. 2B in order to make its policy decision. The system only returns information that is appropriate for the user's clearance level, purpose of access, and intended recipient.

In this example, Carl is a government official responsible for determining whether classified information should be released to lower clearance levels. This involves investigating the curation history of specific information items and conditions of previous releases. In this example, the government discovers that classified information regarding Operative Y's location in Oslo, Norway was recently reported in a European newspaper. Carl would like to audit the curation history of this information to determine whether government agents improperly declassified and released Operative Y's identity and location.

FIG. 2C shows an example of a sightings-curation backlog table that enables the curation auditing system 10 to track the curation histories of sensitive information. The backlog table of FIG. 2C shows two versions of the tuple having an ID value 1, which concerns the Operative X sighting as indicated in the sightings table of FIG. 2A. FIG. 2C indicates that the first version of this tuple was inserted by Alex at time stamp (Ts) 1. The second version was created at time 3 when Gayle updated the classification of location from secret to top-secret. The backlog table of FIG. 2C also contains two versions of the tuple having an ID value 2, which concerns the Operative Y sighting per the sightings table of FIG. 2A. The first version was inserted by Alex at time 2. The second version, updated by David at time 4, lowers the policy for Operative Y's identity and location to unclassified.

FIG. 2D shows an example of a statement log that the curation auditing system 10 uses to complement the audit by revealing information about the actual queries responsible for database updates. The command log of FIG. 2D is organized to records all queries submitted to the database along with annotations such as the ID of the user (c-id) submitting the query, the user, the time that the modification was submitted, and the statements identifying the modification (i.e., Insert, Update, Delete).

The curation auditing system 10 can conduct the curation audit by strictly using transaction time temporal database extensions. The temporal backlog structures record all versions of a tuple along with the user IDs that generated new versions of each tuple. This information alone is sufficient to perform the audit, although the actual statement that caused the update may also be of interest to the auditor since it may itself reveal patterns of misuse.

FIG. 3 shows an example of how the curation audit query generator 20 would generate a curation audit query from a curation audit expression. In the example of FIG. 3, an auditor is interested in determining who has decreased the level of classification of an Informant C during the past twelve months. Using the curation audit expression syntax and semantics (During, Audit-Curation, Where) described above could result in a curation audit expression that takes the following form:

During current date—1 year to current date
Audit-Curation—Sightings-Curation s
Where—s.id=2 and before s.source>after.source In this example, the During clause of the curation audit expression specifies a time period (i.e., the past year) for the audit. The Audit-Curation clause stipulates that the Sightings-Curation table is to be audited, where s is the tuple variable in the table to be examined. The Where clause examines who has updated the policy for the location of Operative Y by decreasing the classification level for the source column of tuple with an id=2. The before and after images of updated tuples are accessed using special before and after keywords, similarly to database triggers. In this example, it is assumed that classification levels are ordered such that secret is less than top-secret.

Using the approach described above, the curation audit query generator 20 processes the curation audit expression into a curation audit query to run against the database 10. In the example of FIG. 3, the curation audit query generated from the curation audit query generator 20 includes the declarative select which specifies the function which will conduct the audit. In this example, the function is based on the Sightings-curation backlog table, tuple variable having an id of 2 and the time stamp (ts). The from declarative specifies that the audit will include two tuple variables (s1 and s2) from the Sightings-curation backlog table. The where declarative specifies the conditions for the audit. In this example, only attributes associated with the id of 2 is specified. The next two predicates (i.e., s1.ts between ... and s2.ts between ...) of the where declarative look at the time stamp (ts) during the past year for tuples that have an id of 2. The next predicate (i.e., s1.ts<s2.ts) in the where declarative ensures that only tuples that are in sequence (i.e., right next to each other) are obtained. The following predicate (i.e., not exists ...) ensures that only two consecutive pairs of tuples are retrieved. The final predicate (i.e., s1.source>s2.source) specifies that the source decreased in value in terms of classification.

Using the information shown in FIGS. 2A-2D and the curation audit query generated shown in FIG. 3, the curation audit query generator 20 would reveal that David lowered the classification of Informant C's identity from "top secret" to "secret" at time 4. In addition, although not shown, the curation audit query will return the logged statement of the update that qualifies the audit. The logged statement can be used by the auditor to determine if there has been any misuse.

Figure 4:
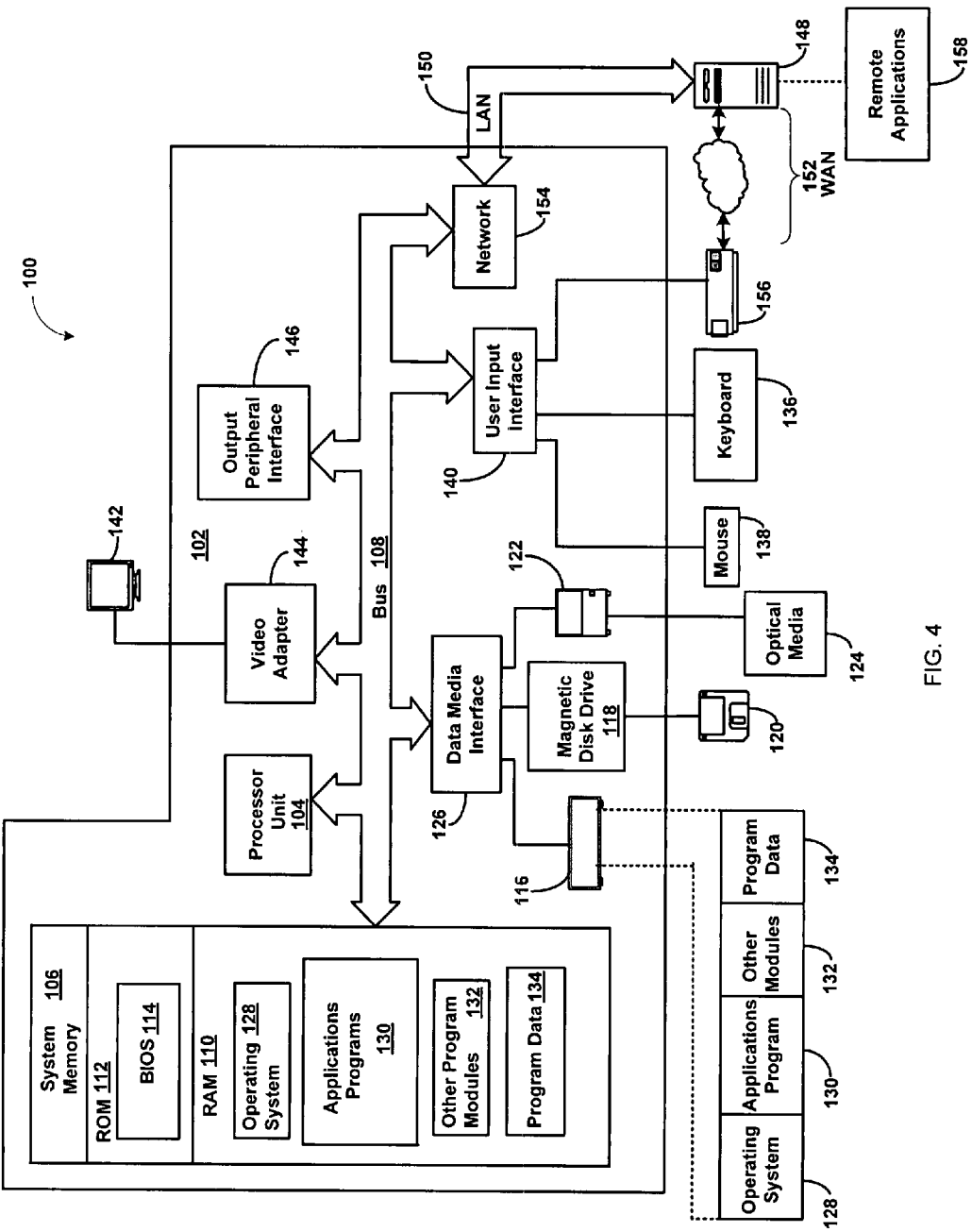
FIG. 4 shows a schematic of an exemplary computing environment in which the curation auditing system of FIG. 1 may operate.

FIG. 4 shows a schematic of an exemplary computing environment 100 in which elements of the curation auditing system 10 shown in FIG. 1 may operate and/or be deployed. The exemplary computing environment 100 is only one example of a suitable computing environment and is not intended to suggest any limitation as to the scope of use or functionality of the approach described herein. Neither should the computing environment 100 be interpreted as having any dependency or requirement relating to any one or combination of components illustrated in FIG. 4.

In the computing environment 100, there is a computer 102 which is operational with numerous other general purpose or special purpose computing system environments or configurations. Examples of well known computing systems, environments, and/or configurations that may be suitable for use with an exemplary computer 102 include, but are not limited to, personal computers (PC), server computers, thin clients, thick clients, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The exemplary computer 102 may be described in the general context of computer-executable instructions, such as program modules, being executed by a computer. Generally, program modules include routines, programs, objects, components, logic, data structures, and so on, that performs particular tasks or implements particular abstract data types. The exemplary computer 102 may be practiced in distributed computing environments where tasks are performed by remote processing devices that are linked through a communications network. In a distributed computing environment, program modules may be located in both local and remote computer storage media including memory storage devices.

As shown in FIG. 4, the computer 102 in the computing environment 100 is shown in the form of a general-purpose computing device. The components of computer 102 may include, but are not limited to, one or more processors or processing units 104, a system memory 106, and a bus 108 that couples various system components including the system memory 106 to the processor 104.

Bus 108 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

The computer 102 typically includes a variety of computer readable media. Such media may be any available media that is accessible by computer 102, and it includes both volatile and non-volatile media, removable and non-removable media.

In FIG. 4, the system memory 106 includes computer readable media in the form of volatile memory, such as random access memory (RAM) 110, and/or non-volatile memory, such as ROM 112. A BIOS 114 containing the basic routines that help to transfer information between elements within computer 102, such as during start-up, is stored in ROM 112. RAM 110 typically contains data and/or program modules that are immediately accessible to and/or presently operated on by processor 104.

Computer 102 may further include other removable/non-removable, volatile/non-volatile computer storage media. By way of example only, FIG. 4 illustrates a hard disk drive 116 for reading from and writing to a non-removable, non-volatile magnetic media (not shown and typically called a "hard drive"), a magnetic disk drive 118 for reading from and writing to a removable, non-volatile magnetic disk 120 (e.g., a "floppy disk"), and an optical disk drive 122 for reading from or writing to a removable, non-volatile optical disk 124 such as a CD-ROM, DVD-ROM or other optical media. The hard disk drive 116, magnetic disk drive 118, and optical disk drive 122 are each connected to bus 108 by one or more data media interfaces 126.

The drives and their associated computer-readable media provide nonvolatile storage of computer readable instructions, data structures, program modules, and other data for computer 102. Although the exemplary environment described herein employs a hard disk 116, a removable magnetic disk 118 and a removable optical disk 122, it should be appreciated by those skilled in the art that other types of computer readable media which can store data that is accessible by a computer, such as magnetic cassettes, flash memory cards, digital video disks, RAMs, ROM, and the like, may also be used in the exemplary operating environment.

A number of program modules may be stored on the hard disk 116, magnetic disk 120, optical disk 122, ROM 112, or RAM 110, including, by way of example, and not limitation, an operating system 128, one or more application programs 130, other program modules 132, and program data 134. Each of the operating system 128, one or more application programs 130, other program modules 132, and program data 134 or some combination thereof, may include an implementation of the curation auditing system 10 of FIG. 1.

A user may enter commands and information into computer 102 through optional input devices such as a keyboard 136 and a pointing device 138 (such as a "mouse"). Other input devices (not shown) may include a microphone, joystick, game pad, satellite dish, serial port, scanner, camera, or the like. These and other input devices are connected to the processor unit 104 through a user input interface 140 that is coupled to bus 108, but may be connected by other interface and bus structures, such as a parallel port, game port, or a universal serial bus (USB).

An optional monitor 142 or other type of display device is also connected to bus 108 via an interface, such as a video adapter 144. In addition to the monitor, personal computers typically include other peripheral output devices (not shown), such as speakers and printers, which may be connected through output peripheral interface 146.

Computer 102 may operate in a networked environment using logical connections to one or more remote computers, such as a remote server/computer 148. Remote computer 148 may include many or all of the elements and features described herein relative to computer 102.

Logical connections shown in FIG. 1 are a local area network (LAN) 150 and a general wide area network (WAN) 152. Such networking environments are commonplace in offices, enterprise-wide computer networks, intranets, and the Internet. When used in a LAN networking environment, the computer 102 is connected to LAN 150 via network interface or adapter 154. When used in a WAN networking environment, the computer typically includes a modem 156 or other means for establishing communications over the WAN 152. The modem, which may be internal or external, may be connected to the system bus 108 via the user input interface 140 or other appropriate mechanism.

In a networked environment, program modules depicted relative to the personal computer 102, or portions thereof, may be stored in a remote memory storage device. By way of example, and not limitation, FIG. 4 illustrates remote application programs 158 as residing on a memory device of remote computer 148. It will be appreciated that the network connections shown and described are exemplary and other means of establishing a communications link between the computers may be used.

An implementation of an exemplary computer 102 may be stored on or transmitted across some form of computer readable media. Computer readable media can be any available media that can be accessed by a computer. By way of example, and not limitation, computer readable media may comprise "computer storage media" and "communications media."

"Computer storage media" include volatile and non-volatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

"Communication media" typically embodies computer readable media containing computer instructions, data structures, program modules, or other data in a modulated data signal, such as carrier wave or other transport mechanism. Communication media also includes any information delivery media.

The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above are also included within the scope of computer readable media.

It is apparent that there has been provided with this disclosure an approach for auditing curation information. While the disclosure has been particularly shown and described in conjunction with a preferred embodiment thereof, it will be appreciated that variations and modifications will occur to those skilled in the art. Therefore, it is to be understood that the appended claims are intended to cover all such modifications and changes as fall within the true spirit of the invention.

What is claimed is:

1. A method for tracking curation history of changes made to sensitive government information stored within a database having base tables and corresponding backlog tables, comprising:

placing changes made to the sensitive government information within the base tables;

recording the changes made to the sensitive government information within the base tables to the corresponding backlog tables, wherein the backlog tables are organized to reconstruct a given state of the tables at any time by recording all versions of a tuple along with user identifications and names of parties generating new versions of each tuple and actual queries that caused the new versions of each tuple;

storing a statement log that contains statements submitted to the base tables that have information on changes made to the sensitive government information, the statement log including text of all queries made to the database along with names and user identifications of parties submitting the queries, a purpose associated with each of the submitted queries, time stamps denoting the beginning and end of the queries that were submitted and the changes that were made to the sensitive government information, wherein the statements form a basis for all changes made to the base tables;

receiving a curation audit expression that specifies sensitive government information to perform a curation audit that examines changes made to the specified sensitive government information, wherein the curation audit expression contains syntax clauses that specify a time period for the curation audit, stipulate a specific base table in the database containing sensitive government information to examine for the curation audit and examine whom is responsible for making changes to the specified sensitive government information;

formulating a curation audit query from the curation audit expression that facilitates the curation audit of examining changes made to the specified sensitive government information;

running the curation audit query against the database to ascertain the curation history of changes made to the specified sensitive government information, wherein the running of the curation audit query comprises querying the backlog tables in accordance with the curation audit query;

using the curation history to identify a person responsible for making changes to the specified sensitive government information;

returning logged statements associated with the identified person responsible for making the changes to the specified sensitive government information;

examining the returned logged statements for suspicious statements that exhibit patterns of potential misuse of the sensitive government information and that are associated with any policy changes made for the sensitive government information; and determining whether any returned logged statements that have been deemed to contain suspicious statements are indicative of misuse of the specified sensitive government information and any policy change made for the sensitive government information.

2. The method according to claim 1, wherein the running of the curation audit query further comprises querying the statement log in accordance with the curation audit query.

3. A computer system that tracks curation history of changes made to sensitive government information, comprising:

at least one processing unit;

memory operably associated with the at least one processing unit;

a curation auditing system storable in memory and executable by the at least one processing unit, the curation auditing system comprising:

a database containing a plurality of sensitive government information, wherein the database comprises a plurality of base tables, backlog tables for each of the base tables and a statement log that stores all statements submitted to the base tables, wherein changes made to the sensitive government information are placed within the base tables and the changes made to the sensitive government information within the base tables are recorded with corresponding backlog tables, wherein the backlog tables are organized to reconstruct a given state of the tables at any time by recording all versions of a tuple along with user identifications and names of parties generating new versions of each tuple and actual queries that caused the new versions of each tuple, and wherein the statements within the statement log contain information on changes made to the sensitive government information, the statement logs including text of all queries made to the database along with names and user identifications of parties submitting the queries, a purpose associated with each of the submitted queries, time stamps denoting the beginning and end of the queries that were submitted and the changes that were made to the sensitive government information, wherein the statements form a basis for all changes made to the base tables; and a curation audit query generator configured to receive a curation audit expression that specifies sensitive government information to perform a curation audit that examines changes made to the specified sensitive government information and generates a curation audit query from the curation audit expression to run against the database that facilitates the curation audit of examining changes made to the specified sensitive government information, wherein the curation audit expression contains syntax clauses that specify a time period for the curation audit, stipulate a specific base table in the database as a source of the curation audit and examine whom is responsible for making changes to the specified sensitive government information, wherein the curation audit query generator is configured to run the curation audit query against the database to ascertain the curation history of changes made to the specified sensitive government information, wherein the running of the curation audit query comprises querying the backlog tables in accordance with the curation audit query, use the curation history to identify a person responsible for making changes to the specified sensitive government information, return logged statements associated with the identified person responsible for making the changes to the specified sensitive government information, examine the returned logged statements for suspicious statements that exhibit patterns of potential misuse of the sensitive government information and that are associated with any policy changes made for the sensitive government information and determine whether any returned logged statements that have been deemed to contain suspicious statements are indicative of misuse of the specified sensitive government information and any policy change made for the sensitive government information.

4. The computer system according to claim 3, wherein the curation audit query generator is configured to return the identification of the person responsible for making the change to the specified sensitive government information along with the time that the change was made.

5. A computer-readable storage device storing computer instructions, which when executed, enables a computer system to perform a method of conducting a curation audit of changes made to sensitive government information stored within a database having base tables and corresponding backlog tables, the method comprising:

placing changes made to the sensitive government information within the base tables;

recording the changes made to the sensitive government information within the base tables to the corresponding backlog tables, wherein the backlog tables are organized to reconstruct a given state of the tables at any time by recording all versions of a tuple along with user identifications and names of parties generating new versions of each tuple and actual queries that caused the new versions of each tuple;

storing a statement log that contains statements submitted to the base tables that have information on changes made to the sensitive government information, the statement log including text of all queries made to the database along with names and user identifications of parties submitting the queries, a purpose associated with each of the submitted queries, time stamps denoting the beginning and end of the queries that were submitted and the changes that were made to the sensitive government information, wherein the statements form a basis for all changes made to the base tables;

accepting a curation audit expression that specifies sensitive government information to perform a curation audit that examines changes made to the specified sensitive government information, wherein the curation audit expression contains syntax clauses that specify a time period for the curation audit, stipulate a specific base table in the database containing sensitive government information that is a source of the curation audit and examine whom is responsible for making changes to the specified sensitive government information;

formulating a curation audit query from the curation audit expression that facilitates the curation audit of examining changes made to the specified sensitive government information;

running the curation audit query against the database to ascertain the curation history of changes made to the specified sensitive government information, wherein the running of the curation audit query comprises querying the backlog tables in accordance with the curation audit query;

using the curation history to identify a person responsible for making changes to the specified sensitive government information;

returning logged statements associated with the identified person responsible for making the changes to the specified sensitive government information;

examining the returned logged statements for suspicious statements that exhibit patterns of potential misuse of the sensitive government information and that are associated with any policy changes made for the sensitive government information; and determining whether any returned logged statements that have been deemed to contain suspicious statements are indicative of misuse of the specified sensitive government information and any policy change made for the sensitive government information.

6. The computer-readable storage device according to claim 5, wherein the running of the curation audit query comprises querying the statement log in accordance with the curation audit query to determine the person responsible for making changes to the specified sensitive government information and the time that the changes were made.

* * * * *